(12) United States Patent
Nakane et al.

(10) Patent No.: US 7,648,748 B2
(45) Date of Patent: Jan. 19, 2010

(54) LIQUID CRYSTALLINE RESIN COMPOSITION FOR BLOW MOLDING

(75) Inventors: Toshio Nakane, Shizuoka (JP); Mineo Ohtake, Shizuoka (JP); Toshio Shiwaku, Shizuoka (JP); Masato Suzuki, Shizuoka (JP)

(73) Assignee: Polyplastics Co., Ltd., Tokyo (JP)

( * ) Notice: Subject to any disclaimer, the term of this patent is extended or adjusted under 35 U.S.C. 154(b) by 476 days.

(21) Appl. No.: 11/580,091

(22) Filed: Oct. 13, 2006

(65) Prior Publication Data
US 2007/0085056 A1 Apr. 19, 2007

Related U.S. Application Data

(63) Continuation-in-part of application No. 11/541,681, filed on Oct. 3, 2006, now abandoned.

(30) Foreign Application Priority Data

Oct. 13, 2005 (JP) .............................. 2005-298342

(51) Int. Cl.
*B29D 22/00* (2006.01)
*C08L 67/00* (2006.01)
*C08L 77/12* (2006.01)

(52) U.S. Cl. .................... 428/36.8; 428/34.1; 428/35.7; 428/36.9; 524/514; 525/63; 525/66; 525/170; 525/181; 525/183

(58) Field of Classification Search ................ 428/34.1, 428/36.7, 36.8, 36.9; 524/514; 525/63, 66, 525/170, 181, 183
See application file for complete search history.

(56) References Cited

FOREIGN PATENT DOCUMENTS

JP          06-306261          11/1994

*Primary Examiner*—Ana L Woodward
(74) *Attorney, Agent, or Firm*—Buchanan Ingersoll & Rooney PC

(57) ABSTRACT

The present invention provides a liquid crystalline resin composition capable of readily blow-molding a molded article having uniform thickness, with the addition of good blow-moldability owing to the improved drawdown-resistant property, the improved melt-tension increase rate, and other properties without deteriorating the low gas-permeability which is a characteristic of liquid crystalline resin. Specifically, it provides a liquid crystalline resin composition for blow molding, obtainable by melt-kneading: (A) 100 parts by weight of a melt-processable aromatic polyester and/or polyester amide, which can form an anisotropic molten phase; (B) 10 to 25 parts by weight of a styrene-based copolymer composed of 40 to 97% by weight of a styrene group, 60 to 3% by weight of a specific glycidyl ester of $\alpha,\beta$-unsaturated acid and 0 to 50% by weight of other vinyl-based monomer, wherein the styrene-based copolymer has epoxy equivalents ranging from 300 to 3000 g/eq, and weight average molecular weights of 30000 or more; and (C) 0 to 100 parts by weight of one or more of fibrous filler, powdery or granular filler, and plate-like filler.

18 Claims, No Drawings

LIQUID CRYSTALLINE RESIN COMPOSITION FOR BLOW MOLDING

This is a Continuation-In-Part Application of U.S. patent application Ser. No. 11/541,681, filed Oct. 3, 2006 now abandoned.

TECHNICAL FIELD

The present invention relates to a resin composition for blow molding comprising a specific liquid crystalline resin and a specific epoxy-modified styrene-based copolymer, and a blow-molded article being obtainable by applying blow molding to the composition.

BACKGROUND ART

Since liquid crystalline resins have well-balanced properties among high flowability, mechanical strength, heat resistance, chemical resistance and electrical properties, they have been widely used as high function engineering plastics; and most of them are used for injection molding. Recently, the applications of the liquid crystalline resins have tended to become more advanced and specialized, and it is expected that blow-molded articles having excellent physical properties of the liquid crystalline resins can be efficiently and economically molded by blow molding the resins. For example, since pipes, vessels and the like used under a high temperature atmosphere are required to have high mechanical properties in addition to high heat resistance, they have hitherto been made of metals. However, for the purpose of weight saving, corrosion prevention, production cost reduction and the like, it is desired to produce them by blow molding the liquid crystalline polyester resins. Although the liquid crystalline polyester resins have high flowability and physical properties, they generally have low melt-tension, which is the most important property for applying blow molding, and thus they cause severe drawdown. It is therefore very difficult to obtain molded articles having a desired shape by blow molding the resins. In order to improve this disadvantage, a method using a polyester resin with a high polymerization degree, which has high intrinsic viscosity; a method using a branched polyester; a method adding various fillers, and the like are proposed, but all of them can have only small improving effects, and the materials are inadequate for these processing methods.

In order to solve the disadvantage, JP-A 6-306261 proposes a method, for the purpose of preventing drawdown of a parison, that a liquid crystalline resin is mixed with a styrene-based copolymer comprising styrene, a glycidyl ester of α,β-unsaturated acid and, if necessary, other vinyl-based monomers to improve a melt-tension of the liquid crystalline resin.

However, the method sometimes cannot be used for large-seized molded articles which require more excellent drawdown-resistant property, or molded articles which require severe properties such as further uniformity of thickness, yet.

DISCLOSURE OF THE INVENTION

The present invention aims at providing a liquid crystalline resin composition capable of readily preparing a blow-molded article having uniform thickness, with the addition of good blow-moldability owing to improved drawdown-resistant property, improved melt-tension increase rate and other properties, without deteriorating low gas-permeability which is a characteristic of the liquid crystalline resin.

In order to attain the above-mentioned object, the present inventors have further studied epoxy-modified styrene-based copolymers to be mixed with the liquid crystalline resin. As a result, they have found that only when an epoxy-modified styrene-based copolymer having specific properties is mixed with the resin, a blow-molded article having good blow-moldability and valid uniformity of thickness can be obtained while holding the low gas-permeability and the high mechanical properties, which are the characteristics of the liquid crystalline resin; and have accomplished the present invention.

That is, the present invention provides a liquid crystalline resin composition for blow molding, obtainable by melt-kneading:

(A) 100 parts by weight of a melt-processable aromatic polyester and/or polyester amide, which can form an anisotropic molten phase;

(B) 10 to 25 parts by weight of a styrene-based copolymer comprising: 40 to 97% by weight of a styrene group; 60 to 3% by weight of a glycidyl ester of α,β-unsaturated acid, expressed by the following formula (1); and 0 to 50% by weight of other vinyl-based monomer, wherein the styrene-based copolymer has epoxy equivalents ranging from 300 to 3000 g/eq, and weight-average molecular weights of 30000 or more,

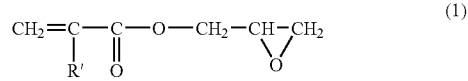

(wherein —R' is a hydrogen atom or an alkyl group); and (C) 0 to 100 parts by weight of one or more of a fibrous filler, a powdery or granular filler, and a plate-like filler.

DETAILED DESCRIPTION OF THE INVENTION

According to the present invention, blow-molded articles having uniform thickness, with the addition of good blow-moldability owing to the improved drawdown-resistant property, the improved melt-tension increase rate, and the other properties without deteriorating the low gas-permeability which is a characteristic of the liquid crystalline resin, can readily be obtained by blow molding. Since the blow-molded articles obtained in the present invention have the good mechanical strength, dimensional stability, uniformity of thickness, and the low gas-permeability, they are suitably used for various vessels, pipes, hollow articles and the like, and particularly they are effectively used for liners for a gas tank or fuel tanks for an automobile.

Now, the components of the composition of the present invention will be explained in detail. The liquid crystalline polyester/polyester amide (A) used in the present invention is a nematic liquid crystalline polyester/polyester amide showing optical anisotropy when it is molten, and is an essential element in the present invention for providing both of heat resistance and easy processability to the composition. The characteristic of the melt anisotropy can be determined by a commonly-used polarization assay utilizing crossed polarizers. More specifically, the anisotropic melt phase can be identified by observing a melt sample which is put on the Leitz hot stage under a nitrogen gas atmosphere to inspect at a magnification of ×40 using a Leitz polarization microscope. The liquid crystalline polymer applicable to the present invention, even if it is on a melt and stationary state, is inspected between crossed polarizers normally to transmit polarization light, indicating that it is optically anisotropic.

By using such a liquid crystalline polyester/polyester amide, very low gas-permeability, excellent properties such as good dimensional stability and good chemical resistance can be exhibited.

More specifically, the component (A) contains constitutional units expressed by the following formulae (2), (3), (4) and (5). The component (A) is an aromatic polyester/polyester amide containing at least 30% by mole of an aromatic hydroxycarboxylic acid group expressed by the formula (2), which may contain 25% by mole or less of repeating units of a dicarboxylic acid group expressed by the formula (3), 25% by mole or less of repeating units of a diol expressed by the formula (4), and 20% by mole or less of repeating units of an aromatic hydroxyamine expressed by the formula (5).

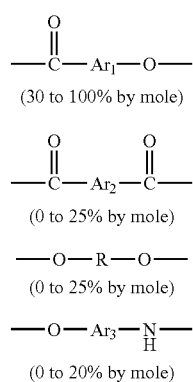

(wherein —Ar$_1$— is a divalent phenylene group and/or a divalent naphthalene group; —Ar$_2$— is one or more selected from a divalent aromatic group and an aliphatic group containing 2 to 8 carbon atoms; —R— is one or more selected from a divalent aromatic group and an aliphatic group containing 2 to 8 carbon atoms; and —Ar$_3$— is one or more selected from a divalent aromatic group and an aliphatic group containing 2 to 8 carbon atoms).

The group —Ar$_1$— expressed by the formula (2) which constitutes a main repeating unit in the liquid crystalline polyester/polyester amide used in the present invention comprises a phenylene group and/or naphthalene group, and is obtained by polycondensation of the corresponding aromatic hydroxycarboxylic acid or the ester-forming compounds thereof. Examples of the aromatic hydroxycarboxylic acid may include aromatic hydroxycarboxylic acids such as 4-hydroxybenzoic acid, 2-hydroxy-6-naphthoic acid, 2-hydroxy-7-naphthoic acid or 4-(4-hydroxyphenyl)benzoic acid; and the ester-forming compounds thereof may be used. They may be used alone or in combination thereof. In particular, as the constitutional unit expressed by the formula (2), a unit containing mainly 4-hydroxybenzoic acid groups and partly hydroxynaphthoic acid groups is preferable. In particular, when constitutional units expressed by the formula (3) mentioned below are in absence or are used in a very small amount in the constitutional units of the polyester used, the constitutional units expressed by the formula (2) comprising the above-mentioned 2 kinds of acid groups are preferably used from the viewpoint of moldability.

The group —Ar$_2$— expressed by the formula (3) and the group —Ar$_3$— expressed by the formula (5), which constitute the liquid crystalline polyester/polyester amide (A) used in the present invention, are each phenylene group, naphthalene group, or diphenylene group, and may be an aliphatic group within a range in which the liquid crystallinity is maintained. The group —R— expressed by the formula (4) is phenylene group, naphthalene group, biphenylene group, and the like, and may be an aliphatic group containing 2 to 8 carbon atoms. The constitutional units expressed by the formulas (3), (4) and (5) are prepared from a dicarboxylic acid (HOOC—Ar$_2$—COOH) or an ester-forming compound thereof, a diol (HO—R—OH), and a hydroxyamine (HO—Ar$_3$—NH$_2$) as starting material, respectively, and they are introduced by polycondensating the acid component and the diol component with the above-mentioned aromatic hydroxycarboxylic acid or the ester-forming compound thereof. Examples of the dicarboxylic acid component for constituting the units expressed by the formula (3) may include known aromatic dicarboxylic acids such as terephthalic acid, 2,6-naphthalene dicarboxylic acid, isophthalic acid, 2,7-naphthalene dicarboxylic acid or 4,4'-diphenyl carboxylic acid, the ester-forming compounds thereof, and the like. Examples of the diol constituting the units expressed by the formula (4) may include known aromatic diols such as hydroquinone, aromatic ring-substituted hydroquinone, 4,4'-biphenol, 2,6-dihydroxynaphthalene or bisphenol A, aliphatic diols such as ethylene glycol, cyclohexane dimethanol, and the like. They may be used alone or in combination thereof. Examples of the aromatic hydroxyamine for constituting the units expressed by the formula (5) may include 4-aminophenol, 4-acetoamidophenol, 3-aminophenol, 3-methyl-4-aminophenol, 2-chloro-4-aminophenol, 4-amino-1-naphthol, 4-amino-4'-hydroxybipheny, and 4-amino-4'-hydroxydiphenylmethane. They may be used alone or in combination thereof.

In the present invention, the —Ar$_1$— group in the formula (2) in the (A) component is preferably 1,4-phenylene group, 2,6-(or 2,7-)naphthalene group, or a combination thereof.

In the present invention, the —Ar$_2$— group in the formula (3) and the —Ar$_3$— group in the formula (5) in the (A) component are each preferably one or two or more selected from 1,4- (or 1,3-)phenylene group and 2,6- (or 2,7-)naphthalene group; and the —R— in the formula (4) is preferably one or two or more selected from 1,4-phenylene group, 4,4'-biphenyl group, 2,6- (or 2,7-)naphthalene group and ethylene group.

The liquid crystalline polyester/polyester amide (A) preferably used in the present invention contains at least 30% by mole of the constitutional units expressed by the formula (2), 25% by mole or less of the constitutional units expressed by the formula (3), 25% by mole or less of the constitutional units expressed by the formula (4), and 20% by mole or less of the constitutional units expressed by the formula (5); more preferably contains at least 45% by mole of the units (2), 20% by mole or less of the units (3), 20% by mole or less of the units (4), and 15% by mole or less of the units (5); and further more preferably contains at least 60% by mole of the units (2), 20% by mole or less of the units (3), and 20% by mole or less of the units (4). Note that, into the liquid crystalline polyester and/or polyester amide (A) used in the present invention further may be introduced, in addition to the above-mentioned units (2), (3), (4) and (5), a comonomer component having an ether bond within a range in which the liquid crystallinity is shown when the polyester and/or polyester amide (A) is molten, and a polyfunctional ester-forming monomer such as pentaerythritol, trimellitic acid, trimesic acid and 4-hydroxyisophthalic acid; and an ester-forming monomer having an ionic group such as sodium sulfoisophthalate, sodium parahydroxyethylphenyl sulfonate in a range within which the liquid crystallinity is maintained. Particularly preferable liquid crystalline resins (A) include copolymerized aromatic polyesters comprising 4-hydroxybenzoic acid and 2-hydroxy-6-naphthoic acid; and aromatic copolyester/polyester amides obtained by copolymerizing the above-mentioned components with a monomer combination of an acid component including terephthalic acid or isophthalic acid and a diol component including hydroquinone, 4,4'-biphenol, or ethylene glycol.

The liquid crystalline thermoplastic polyester/polyester amide (A) used in the present invention can be obtained from the monomer compounds mentioned above by means of a known method such as a direct polymerization or an ester exchange, and usually by a melt polymerization or a slurry polymerization. In the polymerization, the compounds having ester-forming ability may be used as they are, or derivatives having the ester-forming ability which are modified from a precursor before the polymerization, may be used. Various catalysts can be used in the polymerization. Representative examples of the catalyst may include dialkyl tin oxides, diaryl tin oxides, titanium dioxide, alkoxytitanium silicates, titanium alcoholates, alkali metal salts or alkaline earth metal salts of acarboxylic acid, Lewis acid salts such as $BF_3$, and the like. The catalyst is used in an amount of usually about 0.001 to 1% by weight, preferably about 0.01 to 0.2% by weight, based on the total weight of the monomers. If necessary, the polymers prepared by the polymerization method can increase their molecular weights in a solid polymerization by heating under reduced pressure or in inert gas.

Besides, the above-mentioned liquid crystalline polyester/polyester amide resin (A) may be a mixture of 2 or more kinds of the liquid crystalline polyester(s)/polyester amide(s).

The liquid crystalline polyester/polyester amide (A) used in the present invention has a melting point measured by DSC of 270 to 370° C., preferably 290 to 320° C. and a melt viscosity of 20 to 60 Pa·s at a shear rate of 1000 $sec^{-1}$ at a temperature (T1) higher by 20° C. than the melting point.

When the melting point of the liquid crystalline resin is less than 270° C., the mechanical properties of the resin composition are low, and the use of such a resin is limited in fields requiring the strength when it is used as a single layer. On the other hand, when the melting point is more than 370° C., side reactions at high temperatures such as decomposition cannot be inhibited when it is mixed and melt-kneaded with the modified styrene-based copolymer, whereby liquid crystalline resin compositions having an adequate quality cannot be obtained.

Further, when the melt viscosity at a shear rate of 1000 $sec^{-1}$ at T1 is out of the above-mentioned range, the dispersion of the modified styrene-based copolymer is poor, whereby the drawdown-resistant property when the resin composition is blow molded, and the uniformity of thickness are insufficiently improved, thus resulting in exerting bad influences on the mechanical properties and low gas-permeability of the molded articles.

Next, the styrene-based copolymer of the component (B) in the present invention is mixed with the base substance of the liquid crystalline resin (A) to exert an effect to improve the melt-tension, thus resulting in inhibiting the drawdown, whereby the blow-moldability is remarkably improved. The styrene-based copolymer of the component (B) is a styrene-based polymer comprising 40 to 97% by weight of a styrene group, and 60 to 3% by weight of a glycidyl ester of α,β-unsaturated acid expressed by the general formula (1).

Examples of the styrene group may include styrene, α-methyl styrene, brominated styrene, divinyl benzene, and the like; and among them, styrene is preferably used.

As the glycidyl ester units of α,β-unsaturated acid expressed by the formula (1) are exemplified, for example, glycidyl esters of acrylic acid, glycidyl esters of methacrylic acid (hereinafter sometimes referred to as GMA), and glycidyl esters of ethacrylic acid, and the like. In particular, the glycidyl esters of methacrylic acid (GMA) are preferable.

When the content of the glycidyl ester units of α,β-unsaturated acid expressed by the formula (1) is too high, the composition easily gelates to create a problem in the blow-moldability, and the surface state of the molded articles deteriorates, undesirably. When the content is too low, an effect for improving the blow-moldability such as the melt-tension and the drawdown cannot be obtained. The content of the units (1) in the component (B), therefore, is restricted to 60 to 3% by weight, and it is preferably from 50 to 5% by weight.

Incidentally, the styrene-based copolymer (B) may be a multi-component copolymer obtained by copolymerizing one or more other vinyl-based monomers in addition to the above-mentioned two components. Preferable examples of the third component may include acrylonitrile, vinyl ethers, vinyl esters such as vinyl acetate, vinyl chloride or vinyl propionate, maleic anhydride, phenyl maleimide, and the like. In particular, acrylonitrile is the most preferable component as the third component, and terpolymers comprising 50% by weight or less, preferably 40% by weight or less, of acrylonitrile have better effect for improving the blow-moldability. Multi-component copolymers supplementarily comprising a small amount of vinyl-based monomers other than the above-mentioned third components as an accessory component may be used, but the use of an olefin component such as ethylene, propylene or butene-1 leads to reduced effects, undesirably.

In the present invention, the (B) styrene-based copolymer is preferably a copolymer containing, in addition to styrene and a glycidyl ester of α,β-unsaturated acid, at least one of acrylonitrile, acrylic acid ester, maleic anhydride and phenyl maleimide.

The styrene-based copolymer (B) in the present invention can be easily prepared by a usual radical polymerization of the above-mentioned monomers, using a radical polymerization catalyst. As the copolymer (B) in the present invention may be graft-copolymers wherein a small amount of a vinyl-based polymer is grafted on or crosslinked to a linear copolymer through a chemical bond. Examples of such a vinyl-based monomer constituting the branched or crosslinked segments may include acrylic acid, alkyl esters of acrylic acid, methacrylic acid, alkyl esters of methacrylic acid, styrene, acrylonitrile, and the like. The copolymers having such a branched or crosslinked structure can be prepared by, for example, copolymerizing at least one kind of the above-mentioned vinyl-based monomers with radical polymerizable organic peroxide in the presence of the above-mentioned linear copolymer to produce a peroxide group-containing copolymer, and kneading the obtained copolymer with heating. In the present invention, the component (B) itself must be a flowable substance at a melt kneading temperature. It is preferable to use the component (B) having a lower melt viscosity than that of the liquid crystalline resin (A) at a melt-kneading temperature. Particularly preferably, the viscosity of the component (B) is half or less of that of the component (A). Copolymers having a high molecular weight and a high melt viscosity, or highly grafted copolymers have low flowability, poor dispersibility to the liquid crystalline resin (A), reduced effect for improving the blow-moldability such as melt-tension and drawdown lower, and bad surface state of the articles, undesirably.

The epoxy-modified styrene-based copolymer (B) used in the present invention must have a weight-average molecular weight of 30,000 or more. When the weight-average molecular weight is less than 30,000, not only the effect for improving the drawdown-resistant property is small but also the viscosity may be lowered in a blow molding machine due to melt retention, undesirably.

Further, the epoxy-modified styrene-based copolymer (B) used in the present invention must have an epoxy equivalent of 300 to 3,000 g/eq, more preferably has an epoxy equivalent of 500 to 3,000 g/eq. When the epoxy equivalent is more than 3,000 g/eq, the effect for improving the blow-moldability such as the drawdown is not shown. On the other hand, when the epoxy equivalent is less than 300 g/eq, the melt viscosity of the resin is remarkably high, thus undesirably resulting in causing such a defect that the compound productivity is lowered, or insoluble matter is generated on blow molding and molding is impossible.

As a commercially available raw material of the epoxy-modified styrene-based copolymer (B), which has the above-mentioned characteristics and suitable for use in the present invention, Marproof G-1010S made by NOF Corporation is exemplified.

The amount of the styrene-based copolymer (B) is 10 to 25 parts by weight, preferably 10 to 20 parts by weight, based on 100 parts by weight of the component (A). When the mixed amount is too small, the values of the melt viscosity and melt-tension of the resin composition are insufficiently increased, and when it is too large, the uniformity of thickness of the molded article lowers.

The liquid crystalline resin composition, which is applied to blow molding or extrusion molding, of the present invention may further include, as a component (C), fibrous filler, powdery or granular filler or plate-like filler by adding according to the purpose. The filler is effective for giving the mechanical properties, particularly the strength and rigidity, to the molded articles. Examples of the fibrous filler may include inorganic fibrous substances such as glass fiber, asbestos fiber, carbon fiber, silica fiber, silica alumina fiber, zirconia fiber, boron nitride fiber, silicon nitride fiber, boron fiber, potassium titanate fiber, further fibrous filler of metal including stainless steel, aluminum, titanium, copper or brass, and the like. In particular, the representative example of the fibrous filler is glass fiber. On the other hand, examples of the powdery or granular filler may include carbon black, silica, ground quartz, glass beads, glass powder, silicates such as calcium silicate, aluminum silicate, kaolin, talc, clay, diatomite or wollastonite, metal oxides such as iron oxide, titanium oxide, zinc oxide or alumina, metal carbonates such as calcium carbonate or magnesium carbonate, metal sulfates such as calcium sulfate or barium sulfate, silicon carbide, silicon nitride, boron nitride, various metal powders, and the like. Further, examples of the plate-like filler may include mica, glass flake, various metal flakes, and the like. The inorganic fillers may be used alone or in combination thereof. The combination of the fibrous fillers, particularly the combination of the glass fiber with the powdery or granular filler or the plate-like filler, is preferable, because the combination gives both of mechanical strength, and dimensional stability and electrical characteristics to the molded articles, and moreover, it is effective for improving, particularly, the blow-moldability. When the filler is used, it is desirable to use a sizing agent or a surface-treatment agent. Examples thereof may include functional compounds such as epoxy compounds, isocyante compounds, titanate compounds orsilanecompounds. The amount of the above-mentioned filler or the component (C) added in the present invention is 100 parts by weight or less, preferably 70 parts by weight or less, based on 100 parts by weight of the component (A). When the amount is small, it tends to lower the rigidity and the strength, and when it is more than 100 parts by weight, some troubles are caused during molding, undesirably.

The liquid crystalline resin composition for blow molding of the present invention is obtained by mixing and melt-kneading the liquid crystalline resin (A), the epoxy-modified styrene-based copolymer (B), and optionally the filler (C). The resin composition has a melt viscosity of 15 to 400 Pa·s, preferably 150 to 400 Pa·s, at a shear rate of 1000 $sec^{-1}$ at a temperature (T1) higher by 20° C. than the melting point of the component (A), and has a melt-tension of 50 to 200 mN, preferably 70 to 180 mN, at a drawing speed of 15 m/min at the temperature T1.

When the melt viscosity and the melt-tension are less than the above-mentioned ranges, the drawdown-resistant property is insufficient, and when they are more than the above-mentioned ranges, the stretching property and uniformity of thickness lower, which is unsuitable for use in blow molding.

Moreover, it is desirable that an increase ratio in the melt tension (the melt tension increase rate) at double drawing speed of 30 m/min to the melt tension of the resin composition at a drawing speed of 15 m/min at the temperature T1 is 1.05 fold or more, preferably 1.07 to 1.50 fold. When the increase ratio in the melt-tension is less than the above-mentioned range, it is difficult to perform blow molding.

Here, the increase ratio in the melt-tension is closely related to the uniformity of thickness, and is a very important characteristic for obtaining articles having uniform thickness That is, when the increase ratio in the melt-tension is less than 1.05 fold, in a step in which gas is blown into a parison in blow molding, the parison does not expand uniformly, and sometimes bursts. In order to obtain a preferable increase ratio in the melt-tension, it is essential that as the component (B), epoxy-modified styrene-based copolymers having a weight-average molecular weight of 30,000 or more. When the weight-average molecular weight is less than 30,000, the increase ratio in the melt-tension is less than 1.05 fold, the parison does not expand uniformly to burst, whereby the blow-molded article cannot be obtained, and even if it is obtained, the obtained molded article does not have uniform thickness.

Further, it is possible that the liquid crystalline resin composition of the present invention supplementarily contain other thermoplastic resins in addition to the above-mentioned components. Any thermoplastic resins may be used as the other thermoplastic resin so long as they are stable at high temperatures. Examples thereof may include, for example, polyamide-based polymers, polyester-based polymers other than the above-mentioned polymers, styrene-based (co)polymers other than the above-mentioned polymers, polycarbonates, polyphenylene oxides, polyphenylene sulfides, polyalkylacrylates, polyacetal, polysulfone, polyether sulfone, polyether imide, polyether ketone, fluorocarbon resins, (modified) polyolefins, and the like. These thermoplastic resins may be used also in combination thereof. Of these, as the particularly preferable thermoplastic resins are exemplified polyamide-based resins such as nylon 6, nylon 66, nylon 12, and copolymers thereof. When the polyamide-based resin or the like is added, an amount thereof is preferably 100 parts by weight or less, particularly preferably 60 parts by weight or less, based on 100 parts by weight of the component (A). The polyamide-based resin has an effect for increasing the melt-tension to stabilize the parison, thus resulting in improving the drawdown-resistant property, but when the amount is too large, the characteristics of the component (A) are lost, undesirably. Also, thermoplastic polyester-based polymers which do not show liquid crystallinity are particularly preferable thermoplastic resins to be added. Examples thereof may include, for example, polyethylene terephthalate, bisphenol A/terephthalic acid/isophthalic acid copolymer. An amount of the polyester-based polymer is preferably 100 parts by weight or less, particularly preferably 60 parts by weight or less, based on 100 parts by weight of the component (A). When the amount of the polyester-based polymer is too large, the characteristics of the component (A) are lost, undesirably.

Furthermore, the liquid crystalline resin composition of the present invention may include known substances generally added to synthetic resins, for example, stabilizers such as an antioxidant or a ultraviolet absorber, antistatic agents, fire retardants, coloring agents such as a dye or a pigment, lubricants, crystallization accelerating agents, nucleating agents, and the like according to the required characteristics.

The composition of the present invention is obtained by melt-kneading the above-mentioned components (A), (B) and (C), and optionally the other components required, and then applying blow molding. It is possible that each component is melt-kneaded through a single-screw or twin-screw extruder to give pellets, and the pellets are blow molded, or the molten components are molded immediately after melt kneading to give a parison for blow molding. Also, the components (A), (B) and (C) are melt-kneaded together, or each component is separately melt-kneaded and then they are added, or each component is melt-kneaded twice or more. When general extruders are used, the melt-kneading temperature is from 270 to 380° C., preferably from 280 to 360° C., and the melt-kneading time is preferably from 2 to 5 minutes.

The blow molding in the present invention may be performed using blow molding machines which are generally used for blow molding thermoplastic resins in usual manners. That is, the above-mentioned polyester and/or polyester amide resin composition is plasticized by using an extruder or the like, and extruding it through a ring die; or injecting it to form a molten or softened intermediate parison, blowing air into the parison clamped in a mold to expand the parison, and solidifying it with cooling to give a hollow body. As the forming conditions of the liquid crystalline polyester and/or polyester amide resin composition of the present invention are as follows. A cylinder temperature and a die temperature are each in a range of preferably a temperature lower by 50° C. than the melting point of the resin to a temperature higher by 50° C. than the melting point of the resin, particularly preferably a temperature lower by 40° C. than the melting point of the resin to a temperature higher by 30° C. than the melting point of the resin. Any gas including air and nitrogen may be used, and usually air is used from the economical view point. A blowing pressure is preferably from 3 to 10 kg/cm². The articles also can be formed by using a specific blow molding such as a three-dimensional blow molding machine. Further, it is possible to obtain multilayered blow-molded articles by combining the composition of the present invention as one or more layers with layers prepared from other materials.

A direct blow molding, a sheet blow molding, a multilayered sheet blow molding, a hot parison method, an injection stretch blow molding and the like can be applicable to the blow molding in the present invention.

The liquid crystalline resin compositions of the present invention have better melt-tension and increase ratio in the melt-tension than conventional liquid crystalline resins or the composition thereof, and thus there is no drawdown of parison upon blow molding, and the blow-moldability such as the drawdown property or the increase ratio in the melt-tension is remarkably improved, and hollow molded article having uniform thickness and good appearance can be obtained. Further, the mechanical properties, the heat resistance and the like are excellent, and thus hollow molded articles which can be used in very serious conditions, for example, vessels and tubes including intake manifolds in automobiles, supply-exhaust parts around engines, vessels for high temperature liquid, chemicals or solvent and vessels and tubes such as pipes, floats or the like, can be provided.

EXAMPLES

The present invention is explained in more detailed by means of Examples, but the present invention is not limited thereto. In Examples, physical properties were measured as follows:

(Melting Point and Glass Transition Temperature)

They were measured by using a differential scanning calorimeter (DSC7 made by Parkin-Elmar) at a rate of temperature rise of 20° C./min.

(Liquid Crystallinity)

A molten sample on a hot stage made by Lancome Inc., was observed with a polarization microscope made by Olympus Corporation in a nitrogen atmosphere with a magnification of 150. If polarized light could transmit through optically anisotropic polymers even in a molten quiescent liquid state, when a sample was introduced between the crossed polarizers, it was determined that the sample was optically anisotropy.

(Melt Viscosity)

An apparent melt viscosity was measured by using a capillary rheometer (Capillograph 1B made by Toyo Seiki Co., Ltd.; a piston size: 10 mm) at a temperature of T1 (the melting point+20° C.) at a shear rate of 1000 sec$^{-1}$ conforming to ISO 11443. In the measurement, an orifice having an inner diameter of 1 mm and a length of 20 mm was used.

(Melt-tension)

At the time when a molten polymer extruded from the above-mentioned capillary rheometer through an orifice having an inner diameter of 1 mm and a length of 20 mm at the temperature of T1 (the melting point+20° C.) at a drawing speed of 10 mm/min was drawn at a drawing speed of 15 m/min or 30 m/min in the state of fiber, a tension (mN) applied to the fiber was measured.

(Drawdown Index)

A die having a diameter of 50 mm was attached to a blow molding machine (S-45 ND made by Placo Co., Ltd.), a parison was extruded at a die temperature of 230° C. and a lip width of 1 mm, and a drawdown index, which is a ratio (t 600/t 120) of a time (t 600) taking until the length of the parison reached 600 mm to a time (t 120) taking until the length of the parison reached 120 mm was measured. For example, a resin which does not cause drawdown at all has a drawdown of 5.0 which is the same as the figure of the length of the polymer extruded. There is a tendency that resins that easily cause drawdown have smaller drawdown indexes which are closer to 1. Experientially, materials having a drawdown index of 3.6 or more are suitable for blow molding, and particularly, to obtain large-sized molded articles the drawdown index is preferably 4.1 or more.

(Blow-Moldability (Presence or Absence of Broken Articles and Uniformity of Thickness))

A cylindrical article having an outer diameter of 120 mm and a length of 280 mm was manufactured by using a blow molding machine (S-45ND made by Placo Co., Ltd.) at a cylinder temperature and a die temperature, which were shown in table 1, at a blow pressure of 7 kg/cm², with a die having an outer diameter of 50 mm, and whether or not there are broken parts on the molded article after blowing was visually evaluated. Next, the upper, under and middle sections of the article were cross-sectionally cut, and the thicknesses thereof were measured, and a ratio of the maximum value to the minimum value was shown as the uniformity of thickness.

Production Example 1

(Preparation of a Fully Aromatic Polyester Liquid Crystalline Resin; LCP (A1))

p-Hydroxybenzoic acid 345 parts by weight (73% by mole), 6-hydroxy-2-naphthoic acid 175 parts by weight (27% by mole), potassium acetate 0.02 part by weight and acetic anhydride 350 parts by weight were put in a reactor equipped with a stirrer and a distillation tube, and the space in the reactor was fully replaced with nitrogen. Then, the temperature was elevated to 150° C. under normal pressure and the stirring was started. The mixture was stirred at 150° C. for 30 minutes, and then the temperature was gradually elevated to distill away acetic acid which had been generated as a by-product. When the temperature reached 300° C., the reactor was gradually depressurized to 5 Torr (namely, 665 Pa), and the mixture was stirred at 5 Torr for 1 hour. At the time when the mixture had a desired stirring torque, an outlet provided to the lower part of the reactor was opened to take out a resin strand with nitrogen pressure. The obtained strand was formed into pellets by using a pelletizer. The fully aromatic polyester liquid crystalline resin had a melting point of 280° C. and a melt viscosity of 50.1 Pa·s at 300° C.

Preparation Example 2

(Preparation of a Fully Aromatic Polyester Amide Liquid Crystalline Resin; LCP (A2))

p-Hydroxybenzoic acid 173 parts by weight (56% by mole), 6-hydroxy-2-naphthoic acid 38 parts by weight (9% by mole), p,p'-dihydroxybiphenyl 52 parts by weight (12.5% by mole), terephthalic acid 65 parts by weight (17.5% by mole), 4-(N-acetoamino)phenol 17 parts by weight (5% by mole), potassium acetate 0.04 part by weight and acetic anhydride 221 parts by weight were put in a reactor equipped with a stirrer and a distillation tube, and the space in the reactor was fully replaced with nitrogen. Then, the temperature was elevated to 150° C. under normal pressure and the stirring was started. The mixture was stirred at 150° C. for 30 minutes, and then the temperature was gradually elevated to distill away acetic acid which had been generated as a by-product. When the temperature reached 350° C., the reactor was gradually depressurized to 5 Torr (namely, 665 Pa), and the mixture was stirred at 5 Torr for 1 hour. At the time when the mixture had a desired stirring torque, an outlet provided to the under part of the reactor was opened to take out a resin strand with nitrogen pressure. The obtained strand was formed into pellets by using a pelletizer. The fully aromatic polyester amide liquid crystalline resin had a melting point of 300° C., and a melt viscosity of 36.8 Pa·s at 320° C.

The component (B) used are as follows. An epoxy equivalent of the component (B) was measured by perchloric acid method conforming to JIS K 7236; and the weight-average molecular weights were molecular weight indicated as the molecular weight of polystyrene which is determined by gel permeation chromatography in chloroform as a solvent.

B-1: Marproof G-1010S (an epoxy-modified styrene-based copolymer with an epoxy equivalent of 1700 g/eq and a weight-average molecular weight of 100,000) made by NOF Corporation B'-1 (Comparative product): Marproof G-1005S (an epoxy-modified styrene-based copolymer having an epoxy equivalent of 3,300 g/eq and a weight-average molecular weight of 100,000) made by NOF Corporation B'-2 (Comparative product): Marproof G-0130S (an epoxy-modified styrene-based copolymer having an epoxy equivalent of 530 g/eq and a weight-average molecular weight of 9,000) made by NOF Corporation B'-3 (Comparative product): Marproof G-0250S (an epoxy-modified styrene-based copolymer having an epoxy equivalent of 310 g/eq and a weight-average molecular weight of 20,000) made by NOF Corporation Examples 1 to 4 and Comparative Examples 1 to 7

As shown in Table 1, the liquid crystalline polymer (A1) or (A2) prepared as above, was dry-blended with each type of various epoxy-modified styrene-based copolymers in a ratio shown in Table 1, and then the mixture was melt-kneaded using a twin-screw extruder (TEX 30α made by the Japan Steel Works, Ltd.) at a cylinder temperature of 320° C. (in case of the liquid crystalline polymer (A1)) or 360° C. (in case of the liquid crystalline polymer (A2)) at a throughput of 30 kg/hr at a rotation rate of 200 rpm, and the melt-kneaded composition was pelletized.

Then, the blow molding was performed at a molding temperature shown in Table 1, and the above-mentioned properties were evaluated. Samples for evaluating mechanical properties were manufactured, and the tensile property and the flexural property were evaluated. The tensile property was determined in accordance with ISO 527-1,2. The flexural property was determined in accordance with ISO 178. Results thereof are shown in Table 1.

TABLE 1

|  | Example 1 | Example 2 | Example 3 | Example 4 | Comparative Example 1 | Comparative Example 2 |
|---|---|---|---|---|---|---|
| LCP (A-1) (parts by weight) | 90 | 87.5 | 85 |  | 90 | 85 |
| LCP (A-2) (parts by weight) |  |  |  | 90 |  |  |
| (B-1) (parts by weight) | 10 | 12.5 | 15 | 10 |  |  |
| (B'-1) (parts by weight) |  |  |  |  |  |  |
| (B'-2) (parts by weight) |  |  |  |  | 10 | 15 |
| (B'-3) (parts by weight) |  |  |  |  |  |  |
| Melt-viscosity of the composition (Pa·s) | 182.7 | 288.3 | 313.6 | 173.0 | 218.8 | 257.8 |

TABLE 1-continued

|  | | | | | | |
|---|---|---|---|---|---|---|
| Melt-tension at a drawing speed of 15 m/min (mN) | 85.9 | 128.9 | 143.2 | 78.0 | 89.9 | 103.3 |
| Melt-tension at a drawing speed of 30 m/min (mN) | 97.1 | 145.7 | 164.7 | 88.3 | 91.7 | 106.4 |
| Increase ratio in the melt-tension | 1.15 | 1.13 | 1.15 | 1.12 | 1.02 | 1.03 |
| Drawdown index | 4.0 | 4.4 | 4.8 | 3.8 | 3.2 | 3.4 |
| Cylinder temperature of the blow molding machine and die temperature (° C.) | 300 | 300 | 300 | 320 | 300 | 300 |
| Blow-moldability | ○ | ○ | ○ | ○ | x; broken | x; ununiform thickness in local parts |
| The maximum thickness (mm)/the minimum thickness (mm) | 1.3/1.0 | 1.2/1.0 | 1.3/1.0 | 1.2/1.0 | inability to mold | 2.0/0.2 |
| Tensile strength (MPa) | 183.9 | 183.2 | 185.6 | 184.2 | 178.5 | 181.5 |
| Tensile elongation (%) | 6.8 | 6.4 | 6.2 | 6.7 | 5.9 | 6.0 |
| Flexural strength (MPa) | 162.2 | 160.4 | 162.7 | 161.2 | 161.1 | 160.8 |
| Flexural modulus (MPa) | 8852 | 8780 | 8851 | 8680 | 8990 | 8750 |

|  | Comparative Example 3 | Comparative Example 4 | Comparative Example 5 | Comparative Example 6 | Comparative Example 7 |
|---|---|---|---|---|---|
| LCP (A-1) (parts by weight) | 90 | 90 | 85 | 95 | 70 |
| LCP (A-2) (parts by weight) | | | | | |
| (B-1) (parts by weight) | | | | 5 | 30 |
| (B'-1) (parts by weight) | | 10 | 15 | | |
| (B'-2) (parts by weight) | | | | | |
| (B'-3) (parts by weight) | 10 | | | | |
| Melt-viscosity of the composition (Pa · s) | 282.2 | 153.6 | 169.5 | 102.2 | 1884.0 |
| Melt-tension at a drawing speed of 15 m/min (mN) | 143.3 | 63.1 | 73.3 | 28.9 | 303.1 |
| Melt-tension at a drawing speed of 30 m/min (mN) | 140.4 | 63.7 | 74.8 | 28.9 | 296.3 |
| Increase ratio in the melt-tension | 0.98 | 1.01 | 1.02 | 1.00 | 0.98 |
| Drawdown index | 3.4 | 3.4 | 3.5 | 3.0 | 4.9 |
| Cylinder temperature of the blow molding machine and die temperature (° C.) | 300 | 300 | 300 | 300 | 300 |
| Blow-moldability | x; ununiform thickness in local parts | x; drawdown | x; drawdown | x; drawdown | x; broken |
| The maximum thickness (mm)/the minimum thickness (mm) | 2.0/0.2 | 0.7/0.3 | 0.8/0.3 | inability to mold | inability to mold |
| Tensile strength (MPa) | 181.0 | 182.2 | 183.5 | 183.7 | 180.9 |
| Tensile elongation (%) | 6.1 | 6.2 | 6.7 | 6.8 | 5.9 |
| Flexural strength (MPa) | 163.3 | 161.2 | 159.7 | 138.5 | 164.5 |
| Flexural modulus (MPa) | 8790 | 8840 | 8790 | 6891 | 8871 |

What is claimed is:

1. A liquid crystalline resin composition for blow molding, said composition obtained by melt-kneading:
   (A) 100 parts by weight of a melt-processable aromatic polyester and/or polyester amide, which can form an anisotropic molten phase;
   (B) 10 to 25 parts by weight of a styrene-based copolymer comprising: 40 to 97% by weight of a styrene group; 60 to 3% by weight of a glycidyl ester of α,β-unsaturated acid, expressed by the following formula (1); and 0 to 50% by weight of other vinyl-based monomer, wherein the styrene-based copolymer has epoxy equivalents ranging from 300 to 3000 g/eq, and weight-average molecular weights of 30000 or more,

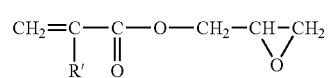

(wherein, —R' is a hydrogen atom or an alkyl group; and (C) 0 to 100 parts by weight of one or more of fibrous filler, powdery or granular filler, and plate-like filler.

2. The liquid crystalline resin composition for blow molding according to claim 1, wherein the (A) melt-processable aromatic polyester and/or polyester amide which can form an anisotropic molten phase contains constitutional units expressed by the following formulae (2), (3), (4) and (5):

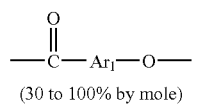

(30 to 100% by mole)

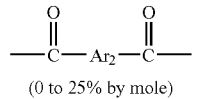

(0 to 25% by mole)

-continued

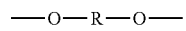
(0 to 25% by mole) (4)

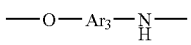
(0 to 20% by mole) (5)

(wherein, —$Ar_1$— is a divalent phenylene group and/or a divalent naphthalene group; —$Ar_2$— is one or more selected from a divalent aromatic group and an aliphatic group containing 2 to 8 carbon atoms; —R— is one or more selected from a divalent aromatic group and an aliphatic group containing 2 to 8 carbon atoms; and —$Ar_3$— is one or more selected from a divalent aromatic group and an aliphatic group containing 2 to 8 carbon atoms).

3. The liquid crystalline resin composition for blow molding according to claim 2, wherein the —$Ar_1$— group in the formula (2) in the (A) component is 1,4-phenylene group, 2,6-(or 2,7-)naphthalene group, or a combination thereof.

4. The liquid crystalline resin composition for blow molding according to claim 2, wherein the —$Ar_2$— group in the formula (3) and the —$Ar_3$— group in the formula (5) in the (A) component are each one or more selected from 1,4-(or 1,3-)phenylene group and 2,6-(or 2,7-)naphthalene group; and the —R— in the formula (4) is one or more selected from 1,4-phenylene group, 4,4'-biphenyl group, 2,6-(or 2,7-)naphthalene group and ethylene group.

5. The liquid crystalline resin composition for blow molding according to claim 2, wherein the (B) styrene-based copolymer is a copolymer containing, in addition to styrene and a glycidyl ester of α,β-unsaturated acid, at least one of acrylonitrile, acrylic acid ester, maleic anhydride and phenyl maleimide.

6. The liquid crystalline resin composition for blow molding according to claim 2, wherein the melt viscosity of the resin composition is in a range from 15 to 400 Pa·s at a shear rate of 1000 sec$^{-1}$ at a temperature (T1) higher by 20° C. than the melting point of the (A) component.

7. The liquid crystalline resin composition for blow molding according to claim 2, wherein the melt tension of the resin composition is in a range from 50 to 200 mN at a drawing speed of 15 m/min at a temperature (T1) higher by 20° C. than the melting point of the (A) component.

8. The liquid crystalline resin composition for blow molding according to claim 2, wherein the increase ratio in the melt tension (the melt tension increase rate) at double drawing speed to the melt tension of the resin composition at a drawing speed of 15 m/min at temperature T1 is 1.05 fold or more.

9. A blow-molded article obtained by applying blow molding to the liquid crystalline resin composition according to claim 2.

10. The liquid crystalline resin composition for blow molding according to claim 2, wherein the (B) styrene-based copolymer has epoxy equivalents ranging from 500 to 3000 g/eq.

11. A blow-molded article obtained by applying blow molding to the liquid crystalline resin composition according to claim 10.

12. The liquid crystalline resin composition for blow molding according to claim 1, wherein the (B) styrene-based copolymer is a copolymer containing, in addition to styrene and a glycidyl ester of α,β-unsaturated acid, at least one of acrylonitrile, acrylic acid ester, maleic anhydride and phenyl maleimide.

13. The liquid crystalline resin composition for blow molding according to claim 1, wherein the melt viscosity of the resin composition is in a range from 15 to 400 Pa·s at a shear rate of 1000 sec$^{-1}$ at a temperature (T1) higher by 20° C. than the melting point of the (A) component.

14. The liquid crystalline resin composition for blow molding according to claim 1, wherein the melt tension of the resin composition is in a range from 50 to 200 mN at a drawing speed of 15 m/min at a temperature (T1) higher by 20° C. than the melting point of the (A) component.

15. The liquid crystalline resin composition for blow molding according to claim 1, wherein the increase ratio in the melt tension (the melt tension increase rate) at double drawing speed to the melt tension of the resin composition at a drawing speed of 15 m/min at temperature T1 is 1.05 fold or more.

16. A blow-molded article obtained by applying blow molding to the liquid crystalline resin composition according to claim 1.

17. The liquid crystalline resin composition for blow molding according to claim 1, wherein the (B) styrene-based copolymer has epoxy equivalents ranging from 500 to 3000 g/eq.

18. A blow-molded article obtained by applying blow molding to the liquid crystalline resin composition according to claim 17.

* * * * *

UNITED STATES PATENT AND TRADEMARK OFFICE
CERTIFICATE OF CORRECTION

| | | |
|---|---|---|
| PATENT NO. | : 7,648,748 B2 | Page 1 of 1 |
| APPLICATION NO. | : 11/580091 | |
| DATED | : January 19, 2010 | |
| INVENTOR(S) | : Nakane et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 574 days.

Signed and Sealed this

Twenty-third Day of November, 2010

David J. Kappos
*Director of the United States Patent and Trademark Office*